United States Patent [19]

Buchan

[11] Patent Number: 4,644,420
[45] Date of Patent: Feb. 17, 1987

[54] CIRCUIT AND METHODOLOGY FOR READING AND TRACKING BINARY DATA FROM MAGNETIC TAPE INDEPENDENTLY OF THE DATA PATTERN ON THE TAPE

[75] Inventor: William A. Buchan, Newport Beach, Calif.

[73] Assignee: Archive Corporation, Costa Mesa, Calif.

[21] Appl. No.: 594,940

[22] Filed: Mar. 29, 1984

[51] Int. Cl.[4] .................. G11B 5/09; G11B 5/102; H03D 3/24
[52] U.S. Cl. ................................. 360/51; 360/67; 375/120
[58] Field of Search .............. 360/51, 67; 375/120; 331/1 A

[56] References Cited

U.S. PATENT DOCUMENTS

| | | | |
|---|---|---|---|
| 4,003,086 | 1/1977 | Larsen et al. | 360/51 |
| 4,127,878 | 11/1978 | Johnson, Jr. et al. | 360/51 |
| 4,321,483 | 3/1982 | Dugan | 375/120 |
| 4,470,082 | 9/1984 | Van Pelt et al. | 360/51 |
| 4,534,044 | 8/1985 | Funke et al. | 360/51 |

Primary Examiner—Vincent P. Canney
Attorney, Agent, or Firm—George F. Bethel; Patience K. Bethel

[57] ABSTRACT

Binary information recorded on magnetic tape is read from the tape and tracked in a manner which is independent of the data pattern on the tape. The time displacement error, TDE (used hereinafter interchangeably) between the data pulses from the tape and a phase-locked-loop reference signal is sampled and then held until the next subsequent opportunity at which the data from the tape can be updated. The TDE between a read binary one and a reference signal is measured by counting a plurality of reference pulses occurring between a reference edge marking the beginning of a data time window and the time at which a binary one is read from the tape. The accummulated count is sampled by a counter whose contents are then stored in a latch when the total TDE has been measured. The TDE in the latch is then used in the phase-locked-loop circuit to adjust the frequency of the reference signal to more nearly match the frequency of the data read from the tape. Thus, whenever a binary one is read from the tape, the TDE is measured, stored and used until the next binary one is read and the time displacement error can then be updated.

20 Claims, 4 Drawing Figures

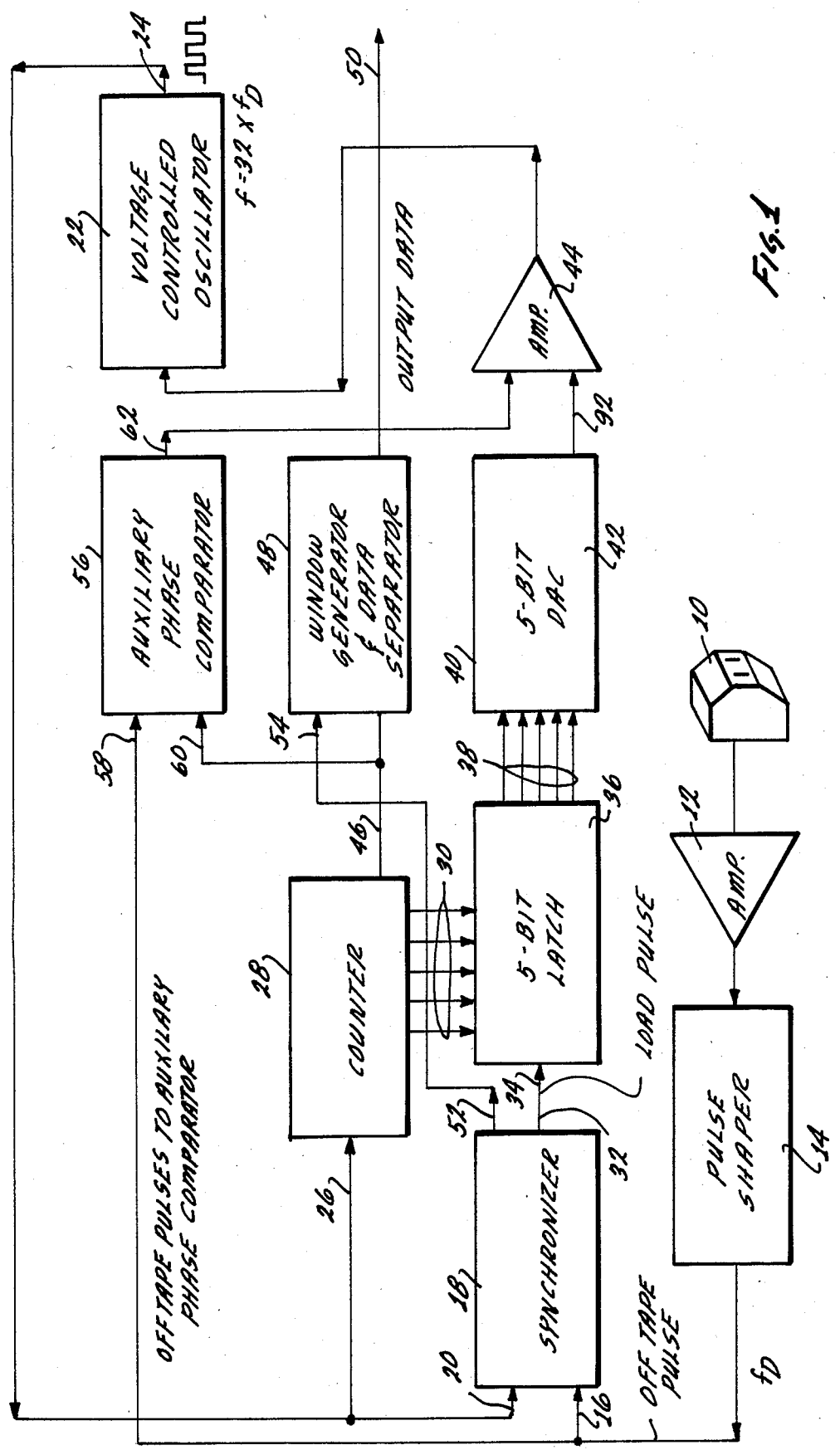

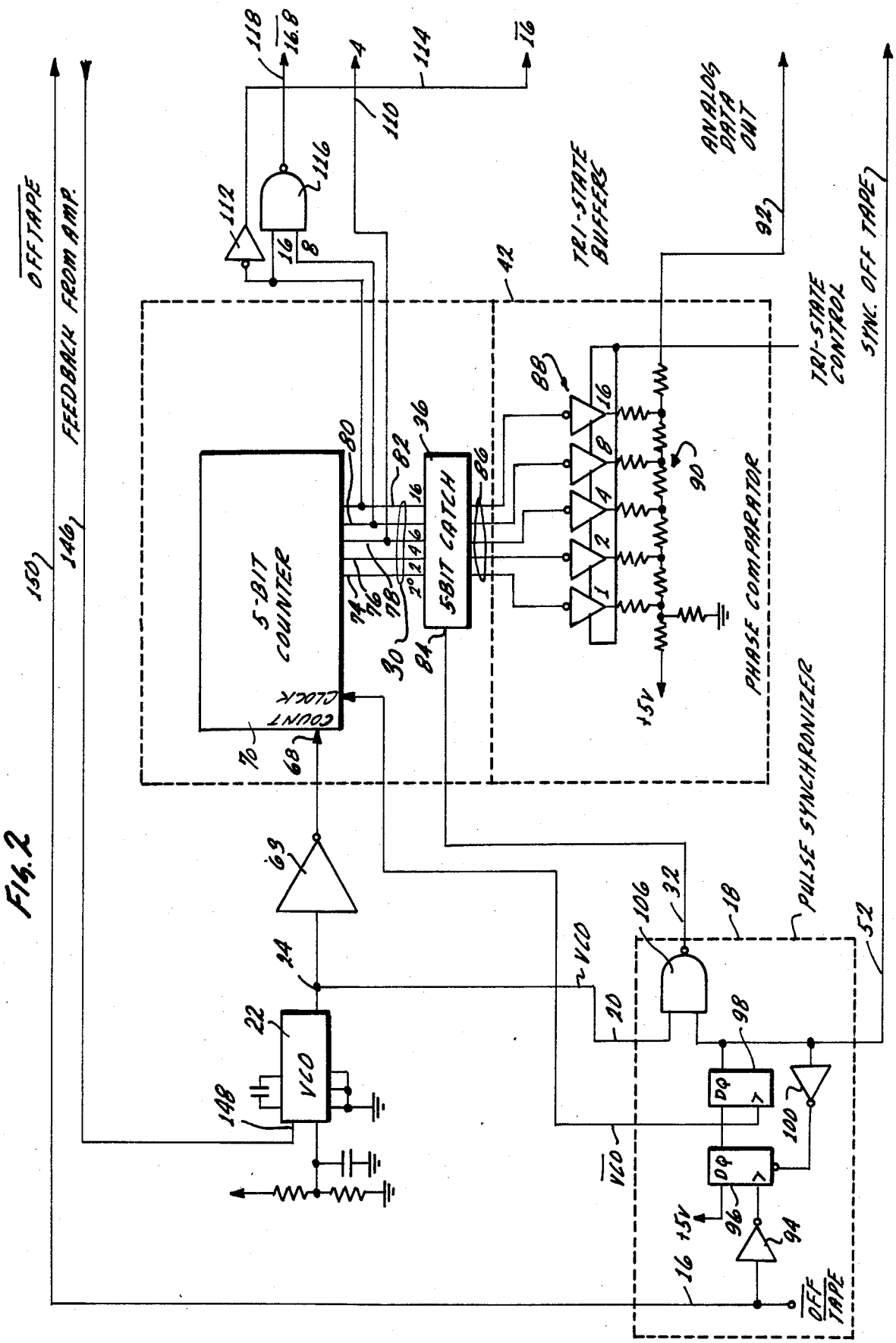

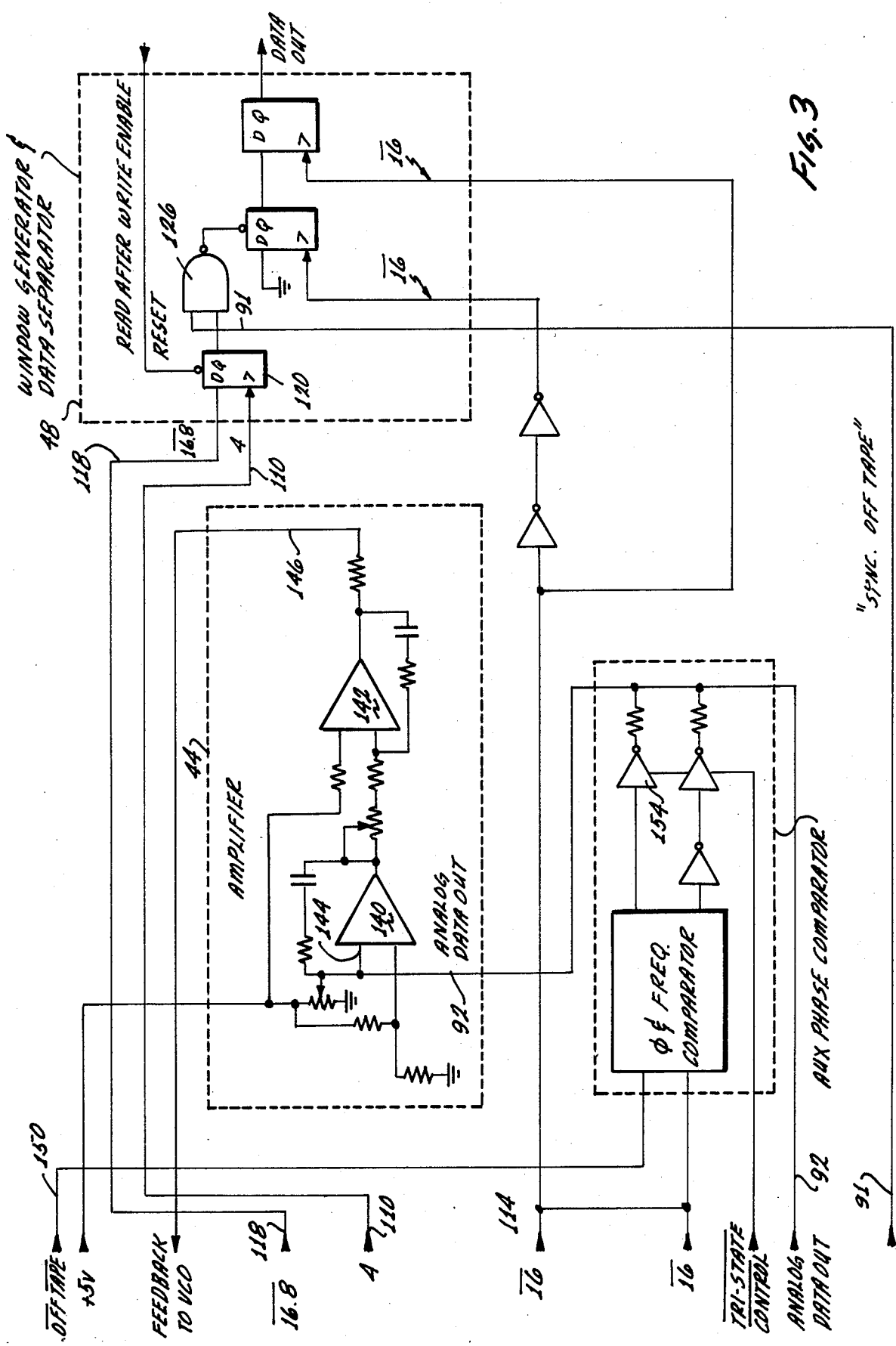

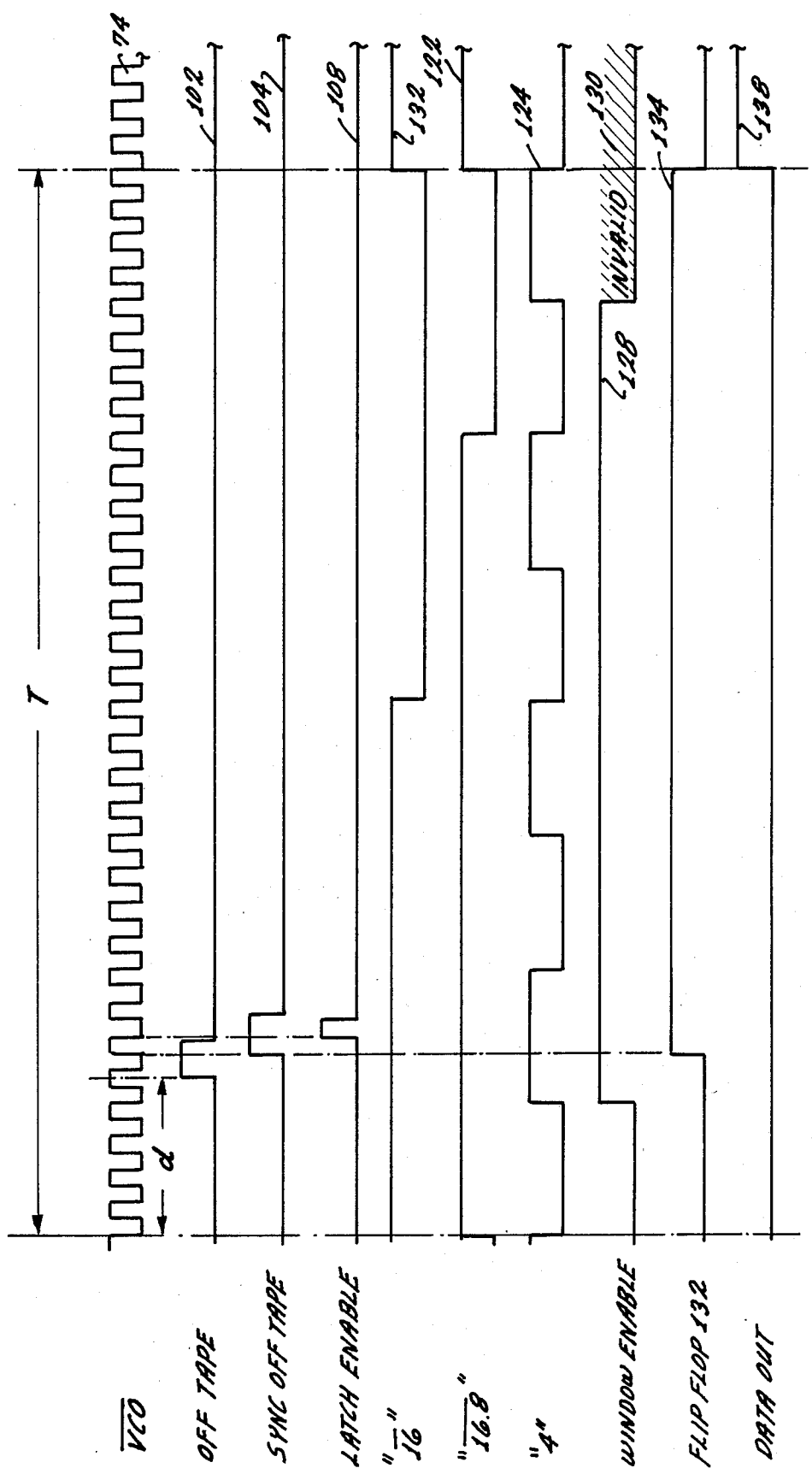

CIRCUIT AND METHODOLOGY FOR READING AND TRACKING BINARY DATA FROM MAGNETIC TAPE INDEPENDENTLY OF THE DATA PATTERN ON THE TAPE

BACKGROUND OF THE INVENTION

1. Field of the Invention

The invention relates to the field of data transfer to and from magnetic tape and in particular, relates to circuitry and methodology for reading data from magnetic tape independently of the data pattern recorded upon the tape.

2. Description of the Prior Art

Modern streaming tape drives are driven as high as 90 inches per second with recording densitities of approximately 10,000 flux reversals per inch, resulting in a data transfer rate in the group of binary bytes of approximately 90,000 bytes per second. Each bit is therefore recorded on less than 100 micro inches of tape (2.5 microns).

Binary information is recorded on magnetic tape by forming a north or south magnetic pole pattern in the thin ferromagnetic layer on the tape to indicate the presence of a signal or a binary one, and by leaving the magnetic domains unorganized to indicate the absence of a signal by the absence of a magnetic pole region to indicate a binary zero. Therefore, a blank tape is equivalent to a tape with prerecorded zeros at each data location. A data pattern recorded on the tape which includes data fields of adjacent binary zeros is then represented by a proportionate length of tape upon which no signals have been recorded. When dealing with data fields as small as those considered here, small variations in tape speed over the read-head can cause prior art phase-locked-loop circuitry to lose track of which data field is being read, thereby losing sequential order of data recorded on the magnetic tape. Such instantaneous speed variations occur due to the mechanical frequencies of resonances, characteristic of the tape head, tape drive, or tape cartridge or cassette. In addition, speed variations at higher frequencies arise from peak shifts on the magnetic tape which inherently result when small magnetized domains are densely packed on the magnetic tape adjacent to blank or nonmagnetized domains.

Typical prior art phase-locked-loop tape readers adjust a read window to compensate for such speed variations of the data field across the magnetic head by matching the read data in a phase comparator with an output frequency from a voltage controlled oscillator. Any time displacement error between the read pulse and a reference edge from the voltage controlled oscillator is amplified and fedback to the voltage controlled oscillator to adjust the output of the oscillator to minimize TDE. Thus, the output of the voltage controlled oscillator is constantly adjusted in an attempt to match the transfer rate of the read data. This adjusted output, proportional to measured TDE, is then used in conventional circuitry to establish a time window within which to detect the presence or absence of the pulse on the magnetic tape. The detector generates an output which is then used to generate a corresponding string of binary ones and zeros according to whether or not a data signal is detected during the defined time on the tape. As long as the adjusted time windows defined by the read circuitry correspond to the actual time windows of the data fields as read by the magnetic head, taking into account perturbations in measured speed of the tape across the head due to instantaneous speed variations data is read from the tape by the circuitry in a correct manner.

However, the voltage, as seen by the amplifier driving the voltage controlled oscillator, is a time average of the error signal generated by the phase comparator. Clearly, errors can be detected between the reference voltage and a signal recorded on the tape only where there is in fact a signal on the tape. As stated above, binary zeros are recorded on the tape as an absence of a signal. Therefore, no TDE is generated corresponding to a binary zero. A binary zero thus is not read in a sense that a signal is detected but by the fact that a signal is not detected during an assumed data window. Therefore, if an instantaneous speed variation error occurred during a string of binary zeros read from the tape, that error cannot be detected until a binary one is read.

Since a time average is taken to produce a feedback signal to the phase comparator, a fewer number of error signals would be found per unit time in the case where a data pattern consisted of a long string of zeros, than in the case where the data pattern was composed entirely of binary ones. Therefore, such prior art phase-locked-loop circuits produce a feedback signal which is dependent on the data pattern. This dependence on data pattern is seen as a dependence of the gain of the phase-locked-loop circuit upon the data pattern. It is desirable to be able to follow or compensate for the instantaneous speed variation errors and to ignore peak shift errors. Therefore, the phase-locked-loop circuit must have a high gain at those lower frequencies characteristic of instantaneous speed variations. It should have a bandwidth below the lowest frequency at which peak shift errors occur when the tape is run at its designed rate, typically 90 inches per second. However, when the gain of the phase-locked-loop circuit varies dependent on the data pattern, which is largely arbitrary within any data coding scheme, the characteristics of the phase-locked-loop gain can change enough so that the bandwidth falls below some instantaneous speed variation frequencies. The prior art has attempted to solve this problem by enhancing the gain of the phase-locked-loop circuit enough such that the largest decrease which would be caused by the data pattern, would still leave the bandwidth well above the highest instantaneous speed variation frequency. However, when such attempts have been made, often the bandwidth will be high enough such that peak-shift perturbations can then be observed and affect the read operation.

Therefore, what is needed is a circuit design and method for reading data from magnetic tape at high speeds and bit densities such that tracking of the fields on the magnetic tape can be accomplished without dependence on the data pattern.

BRIEF SUMMARY OF THE INVENTION

The present invention is an improvement in a circuit for reading binary information from magnetic tape. The improvement comprises a variably or a voltage controlled oscillator having an output frequency controlled by a feedback input to the oscillator. A sample and hold circuit is provided for generating an output proportional to the time displacement error between the data read from the magnetic tape, which is input to the sample and hold circuit, and the output of the voltage controlled oscillator. The output of the voltage controlled oscillator is coupled to one input of the sample and hold circuit. An amplifier is provided and has its input coupled to the output of the sample and hold circuit, and receives the generated signal which is proportional to the time displacement error. The output of the amplifier is coupled to the input of the voltage controlled oscillator whereby the sample and hold circuit, the voltage controlled oscillator and the amplifier form in combination a phase-locked-loop circuit with a gain independent of the number of pulses read from the magnetic tape. In practice, the phase-locked-loop circuit thus formed reads binary data from magnetic tape and produces an output from the voltage controlled oscillator which is proportional to the time displacement error and independent from the number of pulses read from the magnetic tape; and whereby, subsequent reading of pulses on the tape is unaffected by the pattern of data on the tape.

More specifically, the improvement includes a sample and hold circuit for sampling and then storing the time displacement error between a pulse read from the magnetic tape and the beginning of a data time window. The output, time displacement error, generated by the sample hold circuit is held constant until a subsequent pulse corresponding to a time displacement error of different magnitude is read.

These and additional details of the illustrated embodiment are best understood by considering the following drawings wherein like elements are referenced by like numerals.

BRIEF DESCRIPTION OF THE DRAWINNS

The invention will be more clearly understood by reference to the description below taken in conjunction with the accompanying drawings wherein:

FIG. 1 is an overall block diagram illustrating a phase-locked-loop circuit incorporating the invention;

FIG. 2 is a more detailed block diagram particularly illustrating a portion of the circuit shown in FIG. 1;

FIG. 3 is a more detailed block diagram illustrating the remaining portion of the circuit shown in FIG. 1; and, FIG. 4 is a timing diagram of signals generated by the circuitry of FIGS. 2 and 3.

The invention and its various embodiments may be better understood when considering the above Figures in light of the following description.

DESCRIPTION OF THE PREFERRED EMBODIMENTS

The invention is a circuit and method whereby binary information is read at high speeds and densities from magnetic tape in a manner such that the data fields on a tape can be tracked without being affected by a data pattern recorded on tape. When a binary one is detected on the tape, the time displacement error between that detected bit and a reference frequency is sampled and stored within a latch. The stored value of the time displacement error is then used for the input to a voltage controlled oscillator whose output is fed back to a synchronizing circuit. The measured time displacement error will be updated on the next read pulse and the measured value will then be loaded and stored in the latch again until the next update. The read pulses are coupled to the input of the synchronizer circuit as is the output of the voltage controlled oscillator. Counts are accumulated in a counter which is driven by the voltage controlled oscillator and whose output is provided by the input of the latch. However, the latch is loaded only when the synchronizer has received a read pulse from the tape and generates a load pulse at the appropriate synchronized time to load the accumulated count from the counter into the latch. The accumulated count is proportional to the length of time between a reference time corresponding to the beginning of the data window, at which time the counter begins counting from zero and the time at which the read pulse is received. Thus, magnitude of the number stored in the latch is proportional to the time displacement error.

Turn now to FIG. 1 wherein a block diagram of the phase-locked-loop circuit which effectuates the methodology of the present invention, can be more specifically described and understood. A magnetic head 10 reads signals from a magnetic tape (not shown). A conventional amplifier 12 is coupled to head 10 and amplifies the read pulses to produce plus or minus pulses indicative of a binary one, and no signal or a zero pulse indicative of a binary zero. The output of amplifier 10 is shaped in a conventional way to produce a pulse shape and magnitude consistent with the logic levels of the circuitry. Thus the offtape pulses are provided as one input 16 to synchronizing circuit 18. The other input 20 to synchronizing circuit 18 is derived from voltage controlled oscillator 22. Output 24 of oscillator 22 is also supplied as an input 26 to a counter 28 which functions as a divide-by-32 circuit. The five outputs of counter 28 collectively denoted by reference numeral 30, thus represent a five bit parallel output indicative of the count stored within counter 28. Normally, the frequency of oscillator 22 is 32 times higher than the designed data rate on the tape. Therefore, counter 28 begins counting at zero as indicated by 00000 on outputs 30 and counts up to 31, indicated by 11111 at outputs 30 during the time interval equal to the time window during which one bit should be read from the tape.

When a bit is read from the tape, a pulse is provided at input 16 of synchronizer 18 and then at the appropriate moment. i.e., when counter 28 has established a stable count value on outputs 30, a load pulse is generated at the output 32 of synchronizer 18, as will be described in connection with FIG. 2, and provided to the inputs of a five bit data latch 36. In other words, the designed data time window, T, is divided into 32 time subintervals by oscillator 22. When a pulse is detected at input 16 of synchronizer 18, during any given subinterval within the time window, the load pulse will be generated at the output 32 at the next subsequent subinterval within the time window, so that the maximum delay between reading of a pulse storage in latch 36 of the accumulated count in counter 28 is one thirty-second of the time data window, or less. It must, of course, to be understood that the time window could have been differnetly subdivided, e.g. into 16, 64, 128 ... subintervals without departing from the spirit and scope of the invention. As a practical matter, it is found that subdivision of the time window, T, into 32 intervals is sufficient for data recorded at 8,000 bits per inch (10,000 flux reversals per inch) on tape at 90 inches per second.

Outputs 38 of latch 36 are five parallel outputs provided as inputs 40 to a five bit digital-to-analog converter 42. An analog voltage is generated proportional to the digital output of latch 36 and is provided to the input of amplifier 44. Amplifier 44 amplifies the analog signal and provides amplitude and pulse shaping suitable for the input of voltage controlled oscillator 22 to which amplifier 44 is coupled. In addition, amplifier 44 will produce an input voltage for oscillator 22 which will tend to drive oscillator 22 in the direction which will decrease the measured time displacement error between the center of the time window and the read pulse. In other words, amplifier 44 provides a signal to voltage controlled oscillator 22 which tends to move the accumulated count within counter 28 to a count of 15. The count will then be stored within latch 36 by the load pulse generated by synchronizer 18. Therefore, the frequency of oscillator 22 will be varied according to the feedback loop to track the measured data transfer rate from pulses read from the tape by head 10.

The carry output 46 of counter 28 thus represents the adjusted data transfer rate. Output 46 of counter 28 is provided as an input to window generator and data separator 48 which will generate the adjusted time windows and detect whether or not a read pulse falls within any given time window. For purposes of detection of the read pulses, a synchronized read pulse is also provided on output 52 of synchronizer 18 to input 54 of window generator and data separator 48. A string of binary ones and zeros corresponding respectively to the existance or absence of read pulses from the tape is generated by a window generator and data separator 48 and provided at output 50.

It can now be appreciated that FIG. 1 thus far described measures and adjusts for time displacement errors between the read pulses and a reference frequency which is continually adjusted to track the data rate of the read pulses and to adjust a time window for interpretation and correlation with the read pulses. This time displacement error is stored in latch 36 until the next pulse or binary one is detected, which then provides the next opportunity at which an update or adjustment can be made. Thus, if the data coding permitted in a single binary one is followed by a long string of zeros, the circuit would measure the same TDE as would be generated by a long string of binary ones, assuming the time displacement error is constant over time. The constant time displacement error measured upon detection of a single binary one loads the measured value for time displacement error in latch 36 and gives the same result as if the same time displacement error was loaded in the latch 36 by each one of a long string of binary ones. Therefore, what has been disclosed is a circuit which measures a time displacement error which is then used for data read from magnetic tape run at high speed and with high bit densities in a manner which is independent of the data pattern being read.

Auxiliary phase comparator 56 detects the signature or existence of a synchronizing field or "gap", which is recorded on tape, between data fields, and consists of "all ones". The comparator measures the "gap" data transfer rate from the tape at input 58 and compares the circuit generated reference at input 60 during the same time interval. If the tape read "gap pulses" and circuit generated reference pulses are not coherent, the disparity is detected while the "gap" is being read and an appropriate adjustment signal is generated at output 62 and coupled to amplifier 44 to increase or decrease the output 24 of voltage controlled oscillator 22 to match the known frequency of pulses read from the synchronizing field or "gap" from the tape. This ensures no spurious "false lock" conditions can occur.

Turning now to FIG. 2, conventional voltage controlled oscillator 22, operating at approximately thirty-two times the designed frequency has its output 24 inverted by inverter 63. Inverter 63 is coupled to the clock input 68 of five bit counter 70. Outputs 74–82 of counter 70, collectively denoted by reference numeral 30, represent the binary number of counts received from oscillator 22. More particularly, output 74 carries a signal which represents "1"; output 76 represents "2"; output 78 represents "4"; output 80 represents "8"; and output 82 represents "16". Output 74 is thus provided with a pulse train with a frequency at sixteen times the designed frequency while the frequency of inputs 76–82 will each be half again as much as the preceeding output and will thus represent a five bit binary number having a decimal magnitude between 0 and 31. After the counter has reached the maximum count, the next pulse at input 68 will ripple through counter 70 clearing the counter and causing the counter to begin counting again at zero. The number presented at outputs 76–82 is loaded into latch 36 in response to a latch enable signal on input 84. The outputs of latch 36, collectively denoted by reference numeral 86, carry the binary value last loaded into latch 36. Outputs 86 are in turn provided to the inverted inputs of a corresponding plurality of tristate buffers, collectively noted by reference number 88. The output of tristate buffers 88 are coupled to a conventional resistive ladder 90 which weights each of the outputs of buffers 88 according to the binary order magnitude of the signal on outputs 86 coupled to each buffer. The weighted outputs are summed in resistive ladder 90 and presented as an ANALOG DATA OUT signal 92 provided as an input to amplifier 44 generally described in connection with FIG. 1 above and in greater detail in connection with FIG. 3 below.

Consider latch 36 in FIG. 2 once again. The value presented as its inputs is loaded into latch 36 only when the enable input 84 goes active. Latch enable input 84 is coupled to the output of pulse synchronizer circuit 18, again described generally in FIG. 1 and depicted in detail in FIG. 2. The input to pulse synchronizer 18 is an amplified, inverted, and shaped data pulse read from the tape, OFFTAPE. OFFTAPE is reinverted by inverter 94 and coupled to the clock input of flipflop 96. The D input of flipflop 96 is always held high so that the Q output goes high on the rising edge of the signal, OFFTAPE. The Q output of flipflop 96 in turn is coupled to the D input of flipflop 98. The clock input of flipflop 98 is coupled to the voltage controlled oscillator output signal. Therefore, the Q output of flipflop 98 goes high on the rising edge of voltage controlled oscillator, thereby providing an output signal, SYNC OFFTAPE, corresponding to the OFFTAPE pulse and which is synchronized to voltage controlled oscillator signal. The Q output of flipflop 98 is also coupled through inverter 100 to the inverted reset input of flipflop 96. Therefore, a high signal to flipflop 98 resets flipflop 96 causing its Q output to go low, and on the next rising edge of voltage controlled oscillator the Q output of flipflop 98 will be reset low, thus generating a pulse which is one clock period wide for each OFFTAPE pulse.

Turning now to FIG. 4, line 102 represents an OFFTAPE pulse arriving at an arbitrary time relative to voltage controlled oscillator, while line 104 illustrates a synchronized OFFTAPE pulse generated therefrom. The width of SYNC OFFTAPE is thus defined by the period of the VCO output. According to the assumed design, only one such pulse will normally be read in any given data time window, T.

The SYNC OFFTAPE signal provided at the Q output of flipflop 98 is also provided as one input to a NAND gate 106. The other input to NAND gate 106 is the signal, voltage controlled oscillator. Thus, NAND gate 106, whose output, LATCH ENABLE, is coupled to the enable input 84 of latch 36, will go active on the combined event of a rising edge of a voltage controlled oscillator pulse and the synchronized arrival of an OFF-TAPE pulse, SYNC OFFTAPE, as illustrated graphically on line 108 of FIG. 4. The then current value presented at inputs 30 of latch 36, which are approximately equal to the magnitude of time delay d of the OFFTAPE pulse as shown in line 102 of FIG. 4, are then loaded into latch 36. Thus the contents of latch 36 will be updated whenever an OFFTAPE pulse is received.

Selected ones of the outputs 74–82 are used in window generator and data separator 48 as generally described in connection with FIG. 1 above and in detail with FIG. 3 below. In particular, the signal on output 78 corresponding to the second order binary digit "4" is communicated to line 110 in FIG. 3; the inverse of output 82 corresponding to the most significant bit "16", is inverted by inverter 112 in FIG. 2 and provided on line 114 in FIG. 3 as signal $\overline{16}$; the signals on outputs 80 and 82 corresponding to the third and fourth order binary bits are provided as the inputs to NAND gate 116 whose output is communicated to line 118 in FIG. 3 as the signal $\overline{16.8}$.

Turn now to FIG. 3 where the use of each of these signals will be described in greater detail. Considering now window generator and data separator 48 shown in the upper right hand portion of FIG. 3, signal "4" on line 110 is coupled to the clock input of flipflop 120. The D input of flipflop 20 is coupled to line 118 which carries the signal $\overline{16.8}$. In FIG. 4 line 122 represents the signal "$\overline{16.8}$" and line 124 represents the signal, "4". On the rising edge of signal "4", the value at the D input of flipflop 120, "$\overline{16.8}$", is propagated to the Q output of flipflop 120. The Q output of flipflop 120 is provided in turn as one input to NAND gate 126. The other input to NAND gate 126 is the SYNC OFFTAPE signal, on line 52. Therefore, the output of NAND gate 126 is a WINDOW ENABLE signal represented on line 128 of FIG. 4 corresponding to the particular SYNC OFFTAPE pulse illustrated by line 104. The combination of flipflop 120 and NAND gate 126 defines an invalid period 130 illustrated on line 128 during which time the WINDOW ENABLE signal will be held high regardless of the arrival of any SYNC OFFTAPE signals. Therefore, OFFTAPE pulses read just before the end of the data window will be ignored.

The read cycle just described is actually a read-after-write cycle wherein data, which has just been written, is read in a data checking operation. The set input of flipflop 120 which is coupled to an externally generated read-after-write command, has been assumed to be active, thus resulting in the invalid interval 130 shown in FIG. 4. Thus, in the illustrated embodiment the written data, when read in the read-after-write cycle, must be in the middle 75% of the data window, T. However, during a normal data read cycle, the read-after-write command generated by conventional processor control will go inactive and the inverted set input of flipflop 120 will go active. The Q output of flipflop 120 then remains set during the normal read cycle. NAND gate 126 thus has one of its inputs held high so that the other input, SYNC OFFTAPE, will simply be inverted and coupled to the inverted set input of flipflop 132. Therefore, during a normal read cycle invalid interval 130 of WINDOW ENABLE shown by line 128 of FIG. 4 disappears and data will be read at any time within data window T.

The output of NAND gate 126 is coupled to the inverted set input of flipflop 132. Flipflop 132 in turn is clocked by signal "$\overline{16}$" as shown in line 132 of FIG. 4. The D input of flipflop 132 is always held low. Therefore, the Q output of flipflop 132 will remain low at all times until forced high by the WINDOW ENABLE signal from NAND gate 126. As illustrated on line 134 of FIG. 4 the Q output of flipflop 132 is in turn coupled to the D input of flipflop 136 also clocked by signal "$\overline{16}$". The Q output of flipflop 136 is the DATA OUT signal illustrated by line 138 in FIG. 4.

Therefore, the data window is defined in time according to signals derived through latch 36, counter 28 and ultimately from voltage controlled oscillator 22. A signal occurring anywhere during the data window interval T, sets flipflop 132 with the result that the DATA OUT signal is generated at the beginning of the next subsequent time window T, by rising edge of "$\overline{16}$". It should be apparent that other intervals can be generated by combining different binary signals or by using a different multiple of the data frequency for the VCO.

However, the frequency of the signal voltage controlled oscillator is controlled in a phase-locked-loop circuit through the operation, at least in part, of amplifier 44 described in connection with FIG. 1 and shown in FIG. 3 as a conventional two stage amplifier including two integrating stages 140 and 142, biased and coupled using conventional operational amplifier design principles. The amplifiers are particularly characterized by having a boosted gain at lower frequencies in order to provide an enhanced response to instantaneous speed variation perturbations. Line 92 carries the ANALOG DATA OUT signal from digital-to-analog converter 42 described in detail in connection with FIG. 2. ANALOG DATA OUT signal of line 92 is coupled to input 144 of first amplifier stage 140. The output of the second amplifier stage 142 is coupled via line 146 to the feedback input 148 of voltage controlled oscillator 22 to drive it in a conventional manner in order to minimize the phase difference between the OFFTAPE pulse and the divided down voltage controlled oscillator pulse, that is, in order to minimize the magnitude of the ANALOG DATA OUT signal.

As previously described, the time displacement error of equivalently the magnitude of the ANALOG DATA OUT signal is minimized whenever the phase of the voltage controlled oscillator signal is substantially equal to that of the OFFTAPE pulse. or a multiple thereof. Auxillary phase comparator 56 is illustrated in the lower lefthand corner of FIG. 3 and includes a conventional integrated phase and frequency comparator 148 (type 4044). One input of comparator 148 is coupled to line 150 which is provided with the OFFTAPE signal which was also provided as an input to pulse synchronizer 18 as described in connection with FIG. 2. Input 150 could equally well be derived from the output of the synchronizer 52. The other input of comparator 148 is the voltage controlled oscillator derived signal "$\overline{16}$" shown and described in connection with line 132 in FIG. 4. The phase and frequency of the OFFTAPE signal is thus compared to the voltage controlled oscillator related signal "$\overline{16}$" to determine whether the signals are in phase and not harmonics of each other. Outputs 150 and 152 of comparator 148 are coupled to tristate buffers, generally noted by reference numerals 154, with output 152 being inverted and coupled to its corresponding tristate buffer 154. The output of buffers 154 are resistively summed and added to the ANALOG DATA OUT signal which is coupled to the input of first stage 140 of amplifier 44. In the event that the compared frequencies are harmonic, an analog signal (current) is appropriately added to the input of amplifier 44 to add a biasing signal which will drive voltage controlled oscillator 22 in a direction which removes the harmonic.

More particularly, if the frequency of OFFTAPE is greater than voltage controlled oscillator, then output 150 will be set high and output 152 will be a varying signal which on the average is more low than high. Output 152 is inverted and their sum will produce an analog signal at the output of buffers 154 which is generally high. If the frequency of OFFTAPE is less than voltage controlled oscillator, then the output 150 is a varying signal which is generally low on the average and output 152 is held low. If the frequency of OFFTAPE and voltage controlled oscillator are equal and their phases are approximately equal, the outputs 150 and 152 will on the average be equal, so that when output 152 is inverted and summed in buffers 154, the signals will cancel when averaged. The auxiliary phase comparator is switched in by the TRISTATE control signal when "all ones" are detected off tape.

Many alterations and modifications may be made by those having ordinary skill in the art without departing from the spirit and scope of the invention. Therefore, it must be clearly understood that the illustrated embodiment is set forth only by way of example and is not taken to limit or restrict the invention as defined in the following claims. For example, an analog sample and hold using a ramp generator, sample switch and hold capacitor could equally well be embodied in the invention.

I claim:

1. An improvement in a circuit for reading binary information from a magnetic media, said information recorded thereon in a predetermined code with a variable data bit pattern, said improvement comprising:
   a variable oscillator having an output frequency controlled by input to said oscillator;
   TDE detection means for generating an output independent of said data bit pattern responsive to total time displacement error (TDE) between said binary information read from said magnetic tape input to said TDE detection means and the output of said variable oscillator, the output of said variable oscillator being coupled to one input of said TDE detection means for generating said output responsive to the total time displacement error, TDE; and
   an amplifier having its input coupled to the output of said TDE detection means for generating an output proportional to TDE, the output of said amplifier being coupled to the input of said variable oscillator,
   whereby reading of said pulses on said magnetic media is unaffected by said bit pattern on said media.

2. An improvement in a circuit for reading binary information from a magnetic media, said information recorded thereon in an predetermined code with a variable data bit pattern, said improvement comprising:
   a variable oscillator having an output frequency controlled by input to said oscillator;
   TDE detection means for generating an output independent of said data bit pattern responsive to total time displacement error (TDE) between said binary information read from said magnetic tape input to said TDE detection means and the output of said variable oscillator, the output of said variable oscillator being coupled to one input of said TDE detection means for generating said output responsive to the total time displacement error, TDE; and
   an amplifier having its input coupled to the output of said TDE detection means for generating an output proportional to TDE, the output of said amplifier being coupled to the input of said variable oscillator,
   wherein said TDE detection means for generating said output responsive to TDE independent of said bit pattern comprises:
   a sample and hold means for sampling and then storing the time displacement error between a pulse detected from said magnetic media and the beginning of a time reference point, the output being generated by said sample and hold means for sampling and holding time displacement error is held constant until a subsequent pulse, corresponding to a new time displacement error, is detected,
   whereby reading of said pulses on said magnetic media is unaffected by said bit pattern on said media.

3. The improvement as claimed in claim 2 wherein said means for sampling and holding further comprises:
   a synchronizer means for generating a latch enable pulse indicative of the time at which a pulse is read from said magnetic media;
   a latch coupled to said synchronizer means for loading a binary number in response to said latch enable pulse generated by said synchronizer means;
   means for accumulating said binary number from a variable number of pulses generated by said variable oscillator, said means for accumulating said number having its input coupled to the output of said variable oscillator and having an output coupled to the input of said latch wherein the number in said means for accumulating is then loaded into said latch at the time said latch enable pulse is generated by said synchronizer means; and,
   a digital-to-analog converter means having its input coupled to the output of said latch for generating a voltage proportional to said binary number stored in said latch, the output of said digital-to-analog converter means coupled to the input of said amplifier.

4. The improvement of claim 3 further comprising:
   an auxilliary phase comparator means for comparing the frequency of said variable oscillator with the frequency of said pulses read from said magnetic media, said auxilliary phase comparator means including an input coupled to said variable oscillator and an output coupled to said amplifier wherein the output of said auxilliary phase comparator and said digital-to-analog converter means are summed for appropriate feedback to said variable oscillator, said auxilliary phase comparator for detecting whether said frequency of said variable oscillator is a multiple or submultiple of the frequency of said pulses read from said magnetic media.

5. The improvement of claim 2 wherein:

said amplifier is characterized by an enhanced gain at frequencies characteristic of instantaneous speed variations and wherein said amplifier is further characterized by a bandwidth below frequencies typical of peak shifts on said magnetic media.

6. The improvement of claim 4 further comprising:
a window generator and data separator means for generating a binary output signal corresponding to said pulses read from said magnetic tape, said binary output signal being generated at the beginning of a data time window just subsequent to that data time window during which said corresponding pulse was read from said magnetic media, said data window being defined by a predetermined plurality of pulses generated by said variable oscillator, thereby defining a time interval during which a pulse is to be read from said magnetic media.

7. An improvement in a method for reading and tracking binary information from magnetic tape independently of the data pattern of said binary information on said magnetic media, said improvement comprising the steps of:
measuring a time displacement error voltage proportional to time displacement error between a reference signal generated by a variable oscillator and a data signal recorded on said magnetic media during a fixed predetermined interval independently of said data pattern;
storing said time displacement error voltage thus measured; and,
selectively adjusting said variable oscillator using said stored time displacement error to set the frequency of said reference signal generated by said variable oscillator approximately equal to the frequency of said data read from said magnetic media in order to minimize time displacement error measured therebetween;
repeating said steps of measuring, storing, and selectively adjusting at the next subsequently detected pulse on said magnetic media, said stored time displacement being used for adjustment until updated at the next subsequently detected pulse on said magnetic media,
whereby said time displacement error voltage assumes a value independent of the data pattern on said magnetic media.

8. The improvement of claim 7 wherein:
said step of measuring said time displacement error, a plurality of pulses are accumulated within a counter coupled to said variable oscillator wherein the accumulated count within said counter is then stored within a latch during said step of storing at a time substantially coincident with the reading of a pulse from said magnetic media.

9. The improvement of claim 8 wherein:
said accumulated count within said counter is stored within said latch at a time synchronized with a plurality of pulses generated by said variable oscillator.

10. The improvement of claim 9 wherein said step of adjusting comprises:
continuously converting the value of a binary number stored within said latch corresponding to said accumulated count stored within said counter when said pulse is read from said magnetic media;
said binary number being continuously converted into an analog signal provided as one input to an amplifier; and,
an amplifier generating an output coupled to an input of said variable oscillator thereby changing the frequency of said reference signal generated by said variable oscillator in order to force said binary number stored within said latch close to the number representing the center of the time interval.

11. The improvement of claim 10 wherein said step of adjusting further comprises:
comparing the frequency of said reference signal generated by said variable oscillator with the known frequency of said pulse read from said magnetic media to determine whether or not said frequencies are multiples or submultiples of one another; and,
then generating a feedback signal and coupling said feedback signal to said amplifier, said amplifier in turn being coupled to said variable oscillator so that said reference signal generated by said variable oscillator has a frequency which is not a multiple or submultiple of said pulses read from said magnetic media even when substantially no time displacement error exists between said reference signal and said pulses read from said media.

12. An improvement in a circuit for reading binary information from a magnetic tape recorded in a predetermined code with a variable bit pattern, said circuit including a phase-locked-loop circuit for measuring the total time displacement error between a reference signal generated by said circuit and said binary information read from said magnetic tape, said total time displacement error then used by said circuit to adjust said reference signal to minimize said total time displacement error, said improvement comprising:
means for sampling said total time displacement error independently of said bit pattern between said binary information read from said magnetic media and said reference signal during a fixed predetermined time interval; and,
means for storing and holding said total time displacement error thus measured when said binary information is detected on said magnetic media in said predetermined code and until said total time displacement error is again measured when binary information in said predetermined code is again detected on said magnetic media, said means for sampling coupled to said means for storing and holding.

13. The improvement of claim 12 wherein said phase-locked-loop circuit includes a variable oscillator and wherein:
said means for sampling includes a counter having an input coupled to the output of said variable oscillator, said counter accumulating pulses generated by said variable oscillator to form a count up to a predetermined maximum and then resetting to zero to again accumulate pulses from said variable oscillator.

14. The improvement of claim 13 wherein:
said means for storing and holding includes a memory circuit coupled to said counter;
said contents of said counter being written into said memory circuit approximately when a unit of binary information is read from said magnetic media.

15. The improvement of claim 12 wherein:
said means of storing and holding includes a memory circuit coupled to said means for sampling;

said memory circuit storing and holding a signal indicative of said time displacement error measured by said means for sampling.

16. The improvement of claim 14 further including:
a synchronizer means for generating a synchronized signal indicative of said unit of binary information read from said magnetic media;
said synchronized pulse being coupled to said memory circuit thereby enabling said memory circuit and causing said count accumulated within said counter to be stored within said memory circuit.

17. The improvement of claim 16 further comprising:
an auxilliary phase comparator means for determining when said reference signal and said binary information read from said magnetic media have a substantially equal frequency, even when said time displacement error measured therebetween is substantially zero;
said auxilliary phase comparator means having a first input provided with a signal representing said binary information read from said magnetic media; and,
a second input being provided with a signal indicative of the frequency of said reference signal generated by said variable oscillator, the output of said auxilliary phase comparator means being coupled to said amplifier.

18. The improvement of claim 17 wherein:
said second input of said auxilliary phase comparator means is coupled to a carry output of said counter.

19. The improvement of claim 14 wherein said memory circuit is a latch, the outputs of said latch being coupled to a digital-to-analog converter included within said means for storing and holding;
said digital-to-analog converter generating an analog signal proportional to said time displacement error digitally stored within said latch; and,
said output of said digital-to-analog converter being coupled to said amplifier.

20. The improvement of claim 12 further including:
a window generator and data separator means coupled to said means for sampling;
said window generator and data separator means for generating an output data signal at the beginning of the next subsequent data time window following that data time window during which a unit of binary information was read from said magnetic media;
said data time window being defined by a predetermined number of pulses generated by said phase-locked-loop circuit;
said window generator and data separator means generating said output data signal provided said unit of binary information written from said magnetic media during said preceding time window is read during a predetermined subinterval within said time window.

* * * * *